(12) United States Patent
Oksanen (10) Patent No.: US 6,691,757 B2
(45) Date of Patent: Feb. 17, 2004

(54) RADIAL TIRE FOR VEHICLES

(75) Inventor: Veikko Oksanen, Lempäälä (FI)

(73) Assignee: Nokian Renkaat Oyj (FI)

( * ) Notice: Subject to any disclaimer, the term of this patent is extended or adjusted under 35 U.S.C. 154(b) by 0 days.

(21) Appl. No.: 09/826,553

(22) Filed: Apr. 4, 2001

(65) Prior Publication Data

US 2001/0047841 A1 Dec. 6, 2001

(30) Foreign Application Priority Data

Apr. 5, 2000 (FI) .............................................. 20000800
Oct. 24, 2000 (FI) .............................................. 20002330

(51) Int. Cl.$^7$ .......................... B60C 9/00; B60C 13/00; B60C 19/12
(52) U.S. Cl. ........................ 152/555; 152/539; 152/196; 152/548
(58) Field of Search ................................ 152/195, 196, 152/197, 198, 200, 202, 548, 550, 551, 552, 553, 554, 555, 541, 543, 539

(56) References Cited

U.S. PATENT DOCUMENTS

| | | | |
|---|---|---|---|
| 4,067,372 A | | 1/1978 | Masson |
| 4,096,899 A | * | 6/1978 | Kitazawa ..................... 152/542 |
| 4,231,409 A | | 11/1980 | Mezzanotte |
| 4,438,796 A | | 3/1984 | Abe et al. |
| 5,164,029 A | * | 11/1992 | Oohashi ..................... 152/546 |
| 5,392,830 A | | 2/1995 | Janello et al. |

FOREIGN PATENT DOCUMENTS

| | | | |
|---|---|---|---|
| EP | 0219311 | * | 4/1987 |
| EP | 483710 | * | 5/1992 |
| GB | 1072305 | | 6/1967 |
| JP | 59-020707 | * | 2/1984 |
| JP | 62001605 | | 7/1987 |
| JP | 64-67405 | * | 3/1989 |
| JP | 4-208609 | * | 7/1992 |
| JP | 05246210 | * | 9/1993 |
| JP | 11227424 | * | 8/1999 |
| JP | 2000-25411 | * | 1/2000 |

* cited by examiner

Primary Examiner—Michael W. Ball
Assistant Examiner—Justin Fischer
(74) Attorney, Agent, or Firm—Klarquist Sparkman, LLP (57) ABSTRACT

A radial tire for vehicles, comprising two side-cut shields, which are disposed on both sidewalls of the radial tire, the side-cut shields comprising at least two plies, which comprise a first filament array, which consists of mutually substantially parallel filaments, and a second filament array, which consists of mutually substantially parallel filaments, the filaments in the first filament array being at an angle α relative to the filaments of the second filament array, the angle α being 20–90°, and the side-cut shields being disposed to extend from the bead areas of the radial tire to the shoulder areas of the radial tire such that the edges of the side-cut shields facing the shoulder area are disposed between the belt layers and the plies. A method for manufacturing such a radial tire is also disclosed.

21 Claims, 9 Drawing Sheets

RADIAL TIRE FOR VEHICLES

RELATED APPLICATION DATA

The present application claims the benefit of Finnish application No. 20000800, filed Apr. 5, 2000 and Finnish application No. 20002330, filed Oct. 24, 2000.

BACKGROUND AND SUMMARY

The invention relates to a radial tire for vehicles comprising: Viewed in order, starting from the outer surface in road contact towards the inner parts of the radial tire: a tread in road contact, the tread comprising a surface that is in road contact while the tire is in free rotation and two shoulder areas on both sides of the central plane of the radial tire: an undertread having principally the same width as the tread, one or more belt layers having principally the same width as the tread, and one or more plies, which extend from the first bead area to the second bead area of the radial tire, the opposite side of the belt layers of the plies forming the inner surface of the radial tire together with the inner liner; In the following order, on both sides of the tread symmetrically with the central plane of the radial tire: two tread wing areas extending the shoulder area, two sidewalls, and two bead areas.

Cross-ply tires have been increasingly replaced with radial tires in vehicles, especially in construction machines, jeeps, police cars, ambulances etc., because the benefits achieved with radial tires are, for instance, improved traction power and lower fuel consumption. In addition, when used in construction machines, radial tires leave shallower grooves in the terrain. Nevertheless, during use, the tires of jeeps, construction machines and the like frequently hit sharp stones, stubs, branches and similar, and then especially the tire sides are exposed to damage. This involves a greater problem with radial tires than with cross-ply tires, because the rigid belt layers of radial tires support the tread of the tire, so that the tire is more flexible at its sidewalls under load.

There have been attempts to solve this problem in the way described in U.S. Pat. No. 5,078,192, for instance. This publication describes a shield against side cuts made of a ply that consists of aligned and parallel filaments. This side-cut shield is disposed on the sidewall of the tire, and it does not extend to the area under the tread of the tire. However, such a design may entail the problem of the joint between the side-cut shield and the tread being weaker than the surrounding area.

JP patent specification 4, 163, 209, in turn, describes a side-cut shield extending from one bead area of the tire to the other, i.e. over the entire tread. Such a design would not be usable in a radial tire, because it would stiffen the tire structure and thereby eliminate the benefits of radial tires compared to cross-ply tires.

Thus the object of the invention is to provide a side-cut shield in a radial tire for vehicles, which is efficient against sharp cuts, easy and straightforward to manufacture, and yet does not impair the good properties of radial tires.

These objects have now been achieved in the way described in the accompanying claims.

The invention relates to a radial tire, which is characterized by the fact that it comprises two side-cut shields disposed on both sidewalls of the radial tire, the side-cut shields comprising at least two ply layers, the plies comprising a first filament array consisting of mutually substantially parallel filaments, and a second filament array consisting of mutually substantially parallel filaments, the filaments in the first filament array being disposed at an angle $\alpha$ relative to the filaments in the second filament array, the angle $\alpha$ being in the range 20–90°, and the side-cut shields being disposed so as to extend from the bead areas of the radial tire to the shoulder areas of the radial tire, with the edges of the side-cut shields facing the shoulder area disposed between the belt layers and the plies.

Consequently, the web-like side-cut shield of the invention provides efficient protection for the tire sides especially against sharp cutting loads, such as branches, stubs and stones. At the same time, they provide an enhanced shape of the sides of the radial tire, which are more upright than those of conventional tires, allowing the tire sides to avoid obstacles easier. In addition, the side-cut shields of the invention stiffen the tire sides and thus stabilise the behaviour of the tire during running by reducing swaying of the tire. The radial tires of the invention thus allow good protection to be obtained for the tire sides against cutting loads, in accordance with the objects of the invention. In addition, the side-cut shields of the invention do not have any impairing effect on the properties of the radial tire, but on the contrary, further enhance the benefits of radial tires over cross-ply tires.

In accordance with the invention, the filaments in the filament arrays run at an angle of 20–90° relative to each other. With a smaller angle $\alpha$ between the filaments, as in U.S. Pat. No. 5,078,192, where it is 0°, the side-cut shield provides notably poorer protection against cutting loads than with an angle within the range 20–90° as mentioned above.

In one embodiment of the invention, the angle $\alpha$ between the first and second filament array is 30–70°, preferably 40–60°. Similarly, there may be a desired number of ply layers, such as 2–10 layers. However, the preferred number of layers is from two to four, depending on the purpose of use of the tire. If there is a plurality of plies, they are preferably overlapping.

In a preferred embodiment of the invention, the filaments in the filament arrays are made of an organic or inorganic material, such as steel, polyamide, aromatic polyamide or rayon. Yet it is obvious to those skilled in the art that the material of the filaments, the number of plies and the angle between the filament arrays can be freely selected within the scope of protection of the invention in order to achieve the desired result.

In a further preferred embodiment of the invention, the side-cut shields are disposed symmetrically on both sides of the central plane of the radial tire. In this context, the central plane implies the plane that is perpendicular to the axial line and runs transversely to the radial tire through the centre of the tread width.

The sidewalls of the radial tire of the invention may comprise, viewed from the outer surface towards the inner parts of the radial tire, e.g. a sidewall, possibly ply turn-ups, plies and an inner liner. Accordingly, the bead areas of the radial tire of the invention may comprise, viewed from the outer surface towards the inner parts of the radial tire, a clinch, possibly ply turn-ups, an apex and a bead wire, plies and an inner liner. In addition, the bead area comprises an ankle, a heel, a bead base and a toe. It is obvious to those skilled in the art that the side-cut shields of the invention are applicable also to tires with a different design.

In one embodiment of the invention, the side-cut shields have been disposed on the sidewalls between the sidewall or the clinch and any ply turn-up provided or the plies.

In a preferred embodiment of the invention, the side-cut shields may extend to the shoulder areas, starting from their edge facing the wing areas to a distance accounting for 5–100%, preferably 25–95% of the width W of the shoulder area. When the side-cut shield extends to the shoulder areas of the radial tire, preferably underneath the belt layers, optimal resistance against cutting loads is achieved in the entire tire. Also, the joint thus achieved does not form any critical point of discontinuity in the tire, as the materials join without any sharp joint.

In the bead area, in turn, the side-cut shields can be extended substantially to the heel areas, bead bases or toes of the radial tire. The side-cut shield can also be extended to the inner surface of the radial tire, e.g. to a height of the inner surface of the radial tire that accounts for 3–80%, preferably 5–30% of the lateral height H of the radial tire, starting from the toe. Then the side-cut shield extends through the bead base to the shoulder areas, preferably around the bead wire.

In the bead areas of the radial tire, the side-cut shields may be disposed between the clinch an any ply turn-up provided or the bead wire in the heel, bead base and toe areas, and
between the inner liner and the plies in the areas of the inner surface of the radial tire.

The invention also relates to a method for manufacturing a radial tire for vehicles, comprising:

manufacturing a blank on a manufacturing drum by disposing on the manufacturing drum in the following order: among other things, plies extending from the first bead area to the second bead area of the radial tire to be manufactured, two sidewalls on both sides of the central plane of the radial tire to be manufactured and two shoulder areas on both sides of said central plane, the shoulder areas being disposed in the finished tire between the surface in road contact and said sidewall during free rotation of the tire,
disposing on the blank a belt package comprising belt layers and the undertread and having a width substantially equal to the tread of the finished radial tire,
disposing the tread on the belt package, resulting in the tire blank,
vulcanising the tire blank, and the method is characterized by comprising additionally, between the step of disposing the plies and the sidewalls in the blank manufacture, a step of disposing on both the sidewalls of the radial tire two side-cut shields, which comprise at least two ply layers, which comprise a first filament array, which consists of mutually substantially parallel filaments, and a second filament array, which consists of mutually substantially parallel filaments, the filaments in the first filament array being at an angle α relative to the filaments of the second filament array, the angle α being 20–90°, and the side-cut shields being disposed to extend from the bead areas of the radial tire to the shoulder areas of the radial tire such that the edges of the side-cut shields facing the shoulder area are disposed between the belt layers and the plies.

The radial tires of the invention can obviously be manufactured by some other method. However, the method described above is one of the basic methods for manufacturing radial tires of vehicles, in which the fitting of side-cut shields has been included as a production step. Hence the method of the invention is easy and economical, it does not require auxiliary equipment or new working methods, since the side-cut shields are assembled in the tire in the same way as the other fabric layers. Moreover, the tires can be vulcanised in the same mould regardless of the fact whether the tire blank includes side-cut shields or not.

BRIEF DESCRIPTION OF THE DRAWINGS

The invention is explained in greater detail with reference to the accompanying drawings, in which.

DETAILED DESCRIPTION

Figure 1:
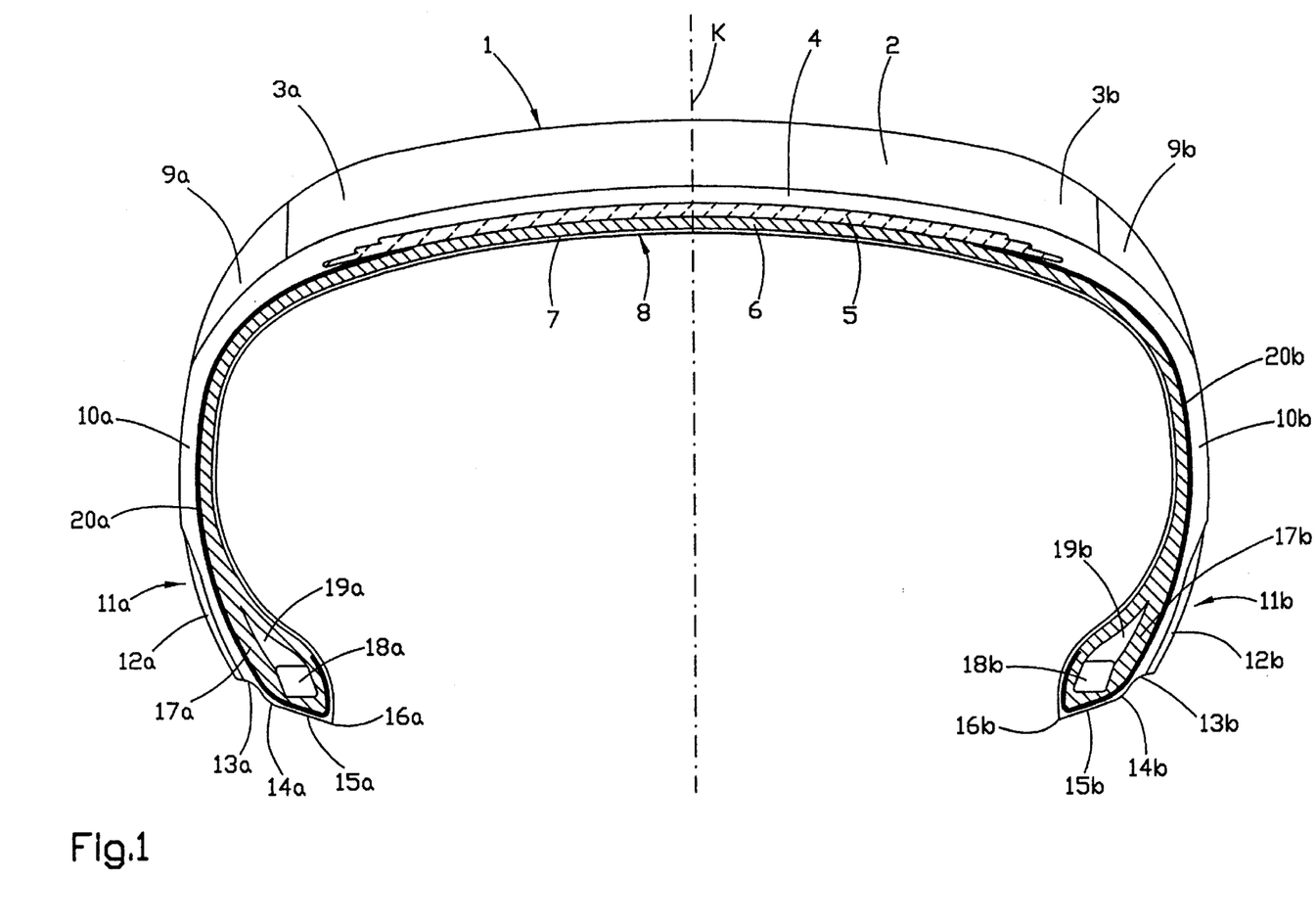
FIG. 1 shows the radial tire of one embodiment of the invention in cross-section.

FIG. 1 shows the radial tire of one embodiment of the invention in cross-section. The figure shows the outer surface, i.e. the tread 1 of the radial tire that gets into contact with the road or the terrain, the tread comprising a surface 2 which gets into contact with the road during free rotation of the tire, and two shoulder areas 3a, 3b on both sides of the central plane K of the tire. It is obvious to those skilled in the art that the tread 1 is not flat but patterned. In addition, the figure shows an undertread 4, which in the finished tire usually is integrated with the sidewalls 10a, 10b, and three belt layers 5 under the undertread 4, which are shown as a continuous area in this figure. The figure further shows the plies 6 and the inner liner 7. The plies 6 and the inner liner 7 form the inner surface 8 of the radial tire.

The figure also shows the wing areas 9a, 9b of the tread extending the shoulder areas 3a, 3b of the tire, and the sidewalls 10a, 10b extending the wing areas. The figure also shows the bead areas 11, 11b of the radial tire, which comprise clinches 12a, 12b, ankles 13a, 13b, heels 14a, 14b, bead bases 15a, 15b, toes 16a, 16b, turn-ups 17a, 17b of the plies 6, bead wires 18a, 18b and apexes 19a, 19b.

The figure further shows the side-cut shields 20a, 20b of the invention, their locations being discussed in detail with reference to FIGS. 2–8. FIGS. 2–8 uses the reference numerals of FIG. 1 for the radial tire parts 3a, 3b, 9a–20b, without the indexes a and b.

Figure 2:
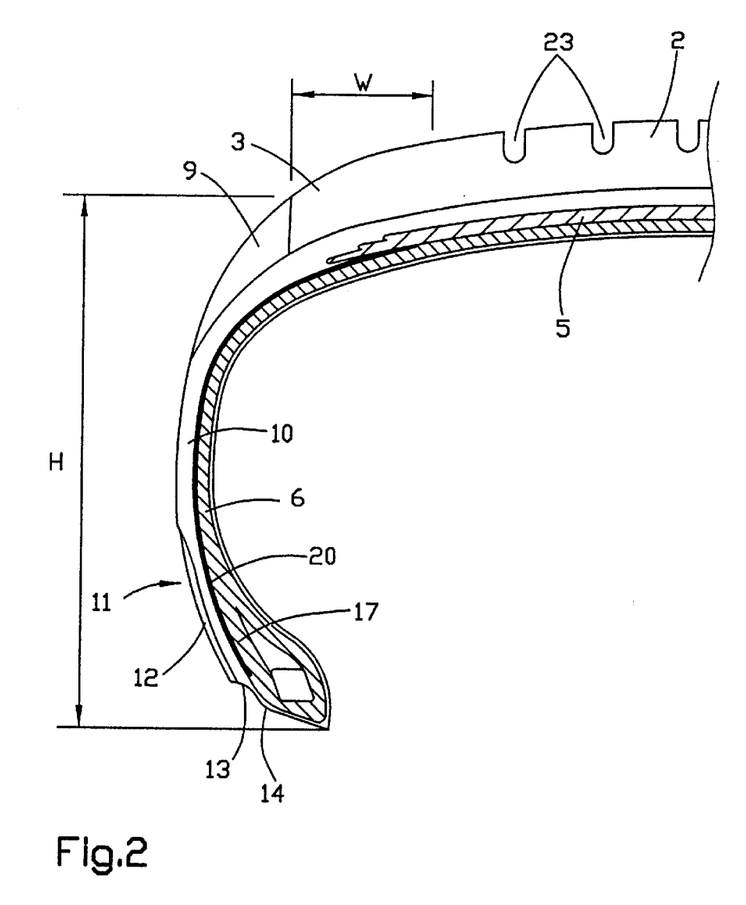
FIG. 2 shows the radial tire of a first embodiment of the invention in partial cross-section.

FIG. 2 shows the radial tire of a first embodiment of the invention in partial cross-section. In the first embodiment, the side-cut shield 20 extends from the shoulder area 3 between the belt layers 5 and the plies 6 all the way to the ankle 13 of the tire. In the shoulder area 3, the side-cut shield 20 extends from the edge facing the wing area 9 to a distance accounting for approx. 90% of the width W of the shoulder area 3. The figure also shows the location of the side-cut shield 20 in the bead area 11 of the tire, between the sidewall 10 and the turn-ups 17 of the plies 6. The figure further illustrates the grooves 23 in the surface 2 that gets into contact with the road or the terrain during free rotation of the tire.

Figure 3:
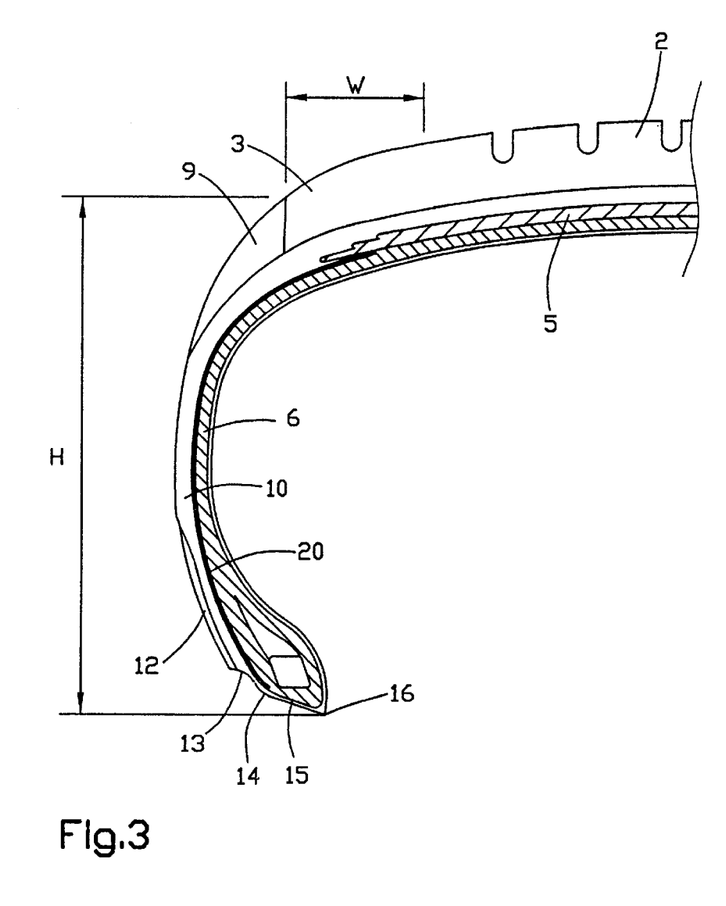
FIG. 3 shows the radial tire of a second embodiment of the invention in partial cross-section.

FIG. 3 shows the radial tire of a second embodiment of the invention in partial cross-section. In the second embodiment, the side-cut shield 20 extends from the shoulder area 3 between the belt layers 5 and the plies 6 to the heel 14 of the tire. In the shoulder area 3, the side-cut shield 20 extends from the edge facing the wing area 9 to a distance that accounts for approx. 65% of the width W of the shoulder area 3.

Figure 4:
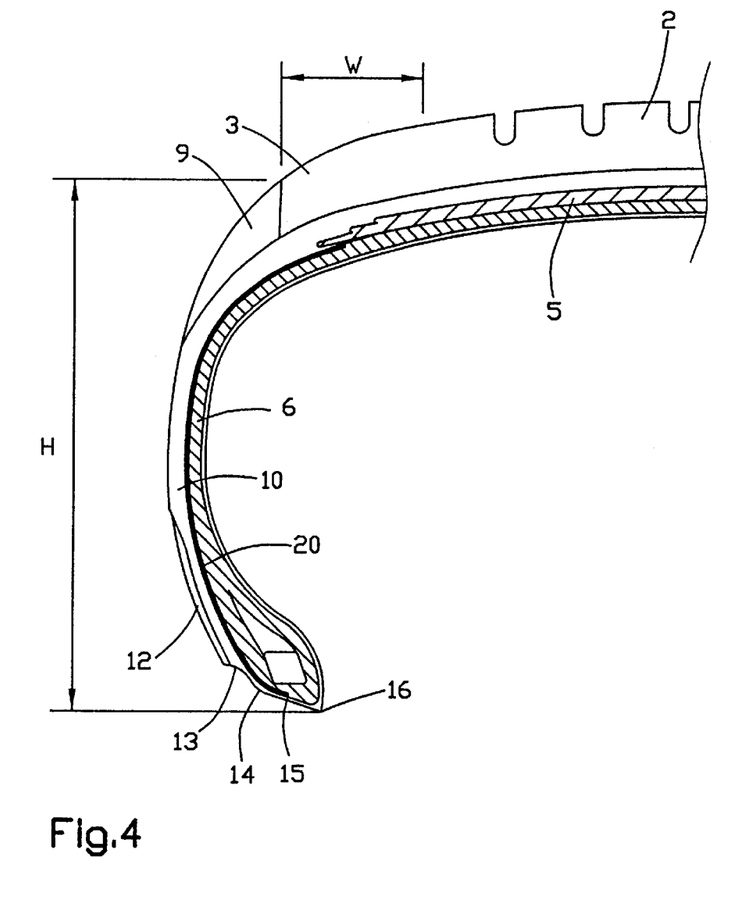
FIG. 4 shows the radial tire of a third embodiment of the invention in partial cross-section.

FIG. 4 shows the radial tire of a third embodiment of the invention in partial cross-section. In the third embodiment, the side-cut shield 20 extends from the shoulder area 3 between the belt layers 5 and the plies 6 to the bead base 15 of the tire. In the shoulder area 3, the side-cut shield 20 extends from the edge facing the wing area 9 to a distance that accounts for approx. 45% of the width W of the shoulder area 3.

Figure 5:
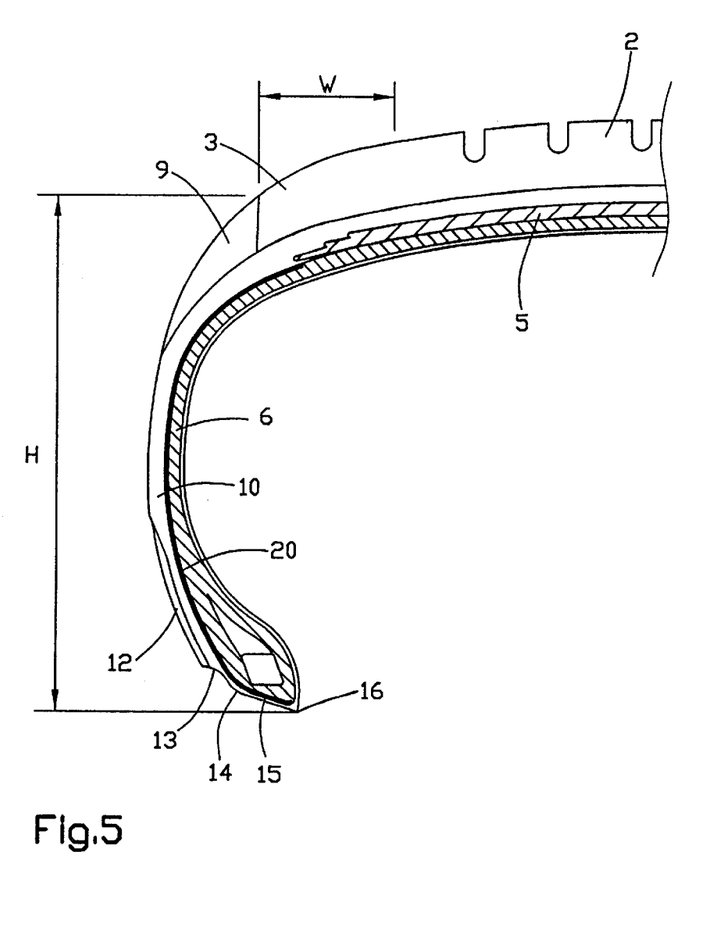
FIG. 5 shows the radial tire of a fourth embodiment of the invention in partial cross-section.

FIG. 5 shows the radial tire of a fourth embodiment of the invention in partial cross-section. In the fourth embodiment, the side-cut shield 20 extends from the shoulder area 3 between the belt layers 5 and the plies 6 to the toe 16 of the tire. In the shoulder area 3, the side-cut shield 20 extends from the edge facing the wing area 9 to a distance that accounts for approx. 32% of the width W of the shoulder area 3.

Figure 6:
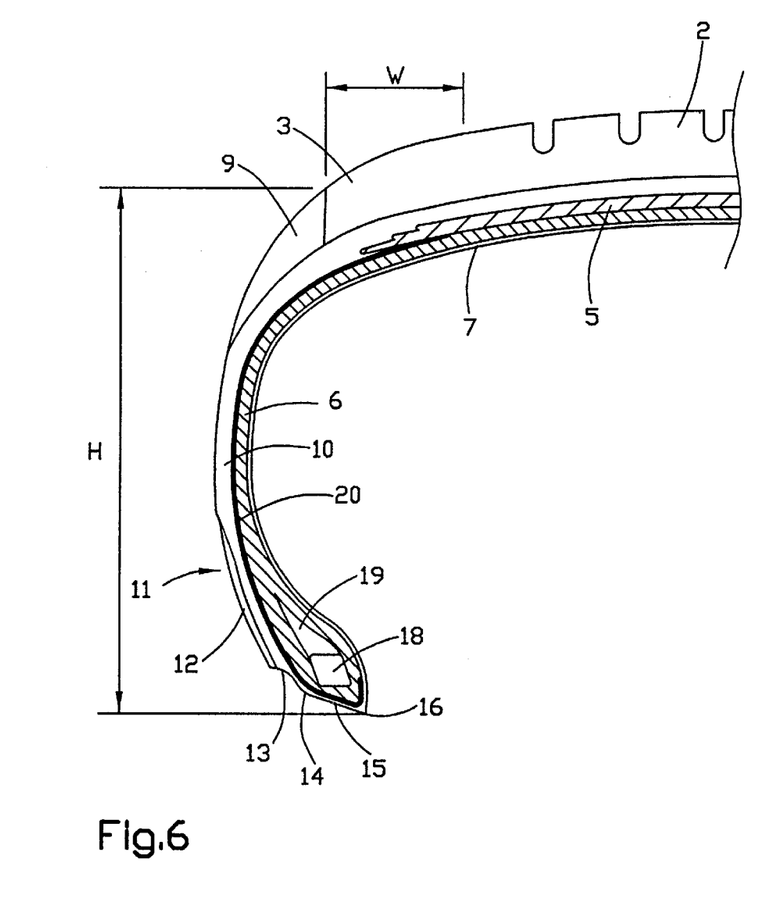
FIG. 6 shows the radial tire of a fifth embodiment of the invention in partial cross-section.
Figure 7:
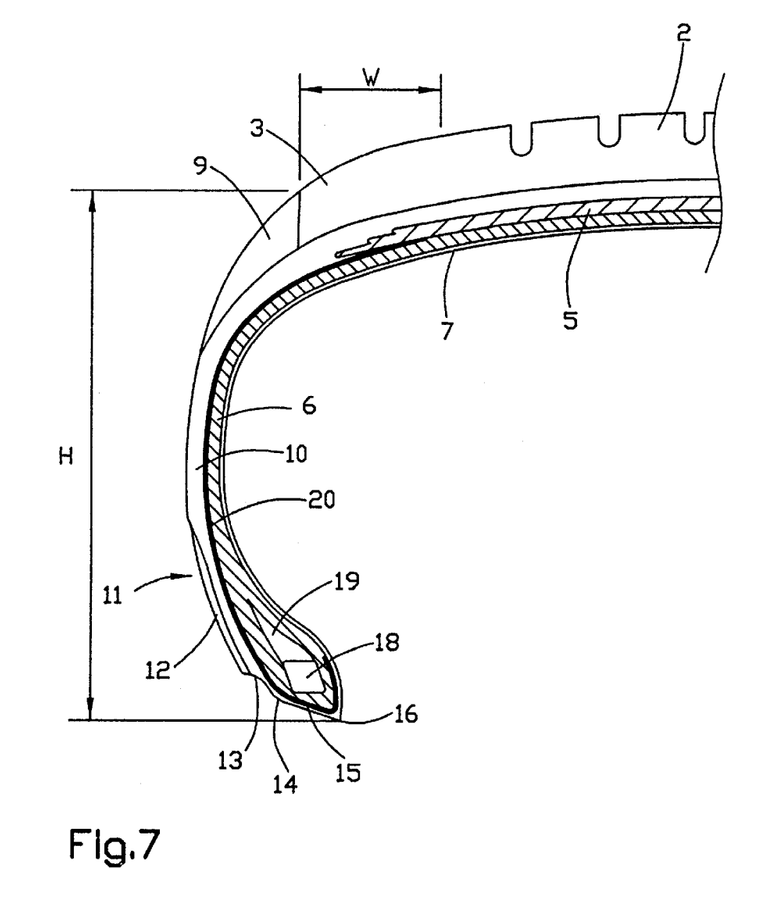
FIG. 7 shows the radial tire of a sixth embodiment of the invention in partial cross-section.
Figure 8:
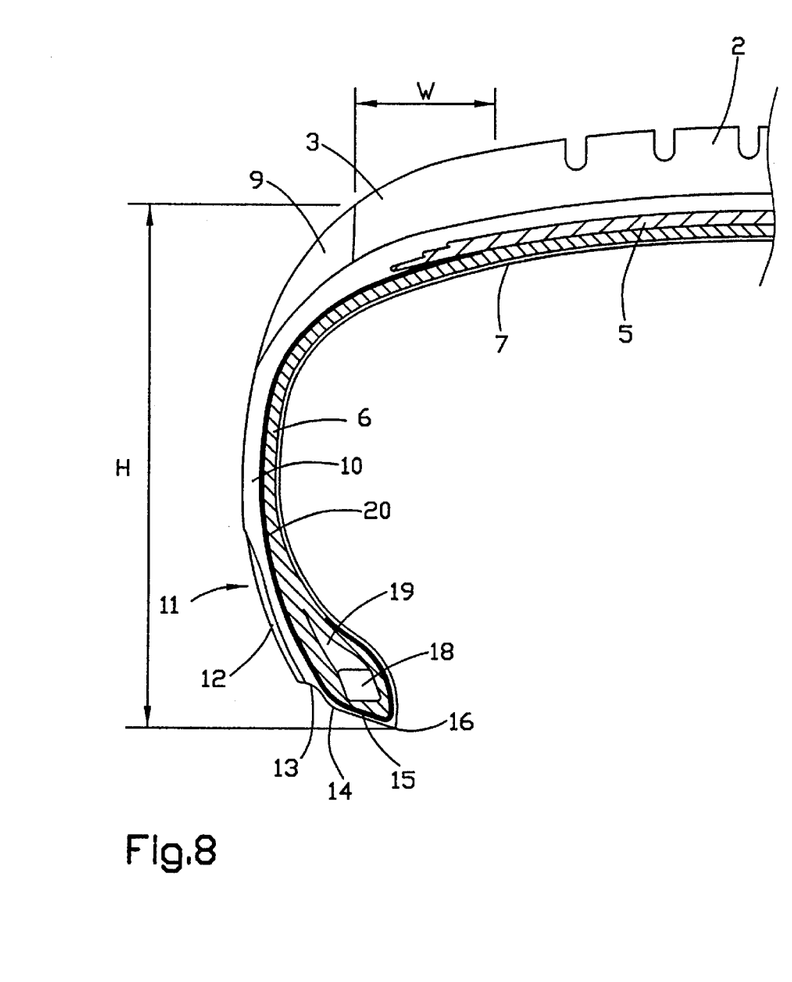
FIG. 8 shows the radial tire of a seventh embodiment of the invention in partial cross-section.

FIGS. 6, 7 and 8 show the radial tire of a fifth, sixth and seventh embodiment of the invention in partial cross-section. In all these embodiments, the side-cut shield 20 extends from the shoulder area 3 of the radial tire, starting from its edge facing the wing area 9, to a distance that accounts for approx. 90% of the width W of the shoulder area 3. In all these embodiments the side-cut shield 20 is also disposed in the shoulder area 3, between the belt layers 5 and the plies 6. In the fifth, sixth and seventh embodiments, the side-cut shield 20 extends similarly from the shoulder area 3 to the tire bead area 11 around the bead wire 18 to a height that accounts for 7%, 12% ad 21% respectively of the height H of the radial tire side, starting from the toe 16. In the bead area, the side-cut shield 20 is disposed between the inner liner 7 and the plies 6.

Thus FIGS. 2–8 show various embodiments of the radial tire of the invention. The embodiments are mutually different with regard to the location of the ends of the side-cut shield 20. It is obvious to those skilled in the art that the side-cut shield 20 can be disposed in the tire in some other way than those shown in the figures.

Figure 9:
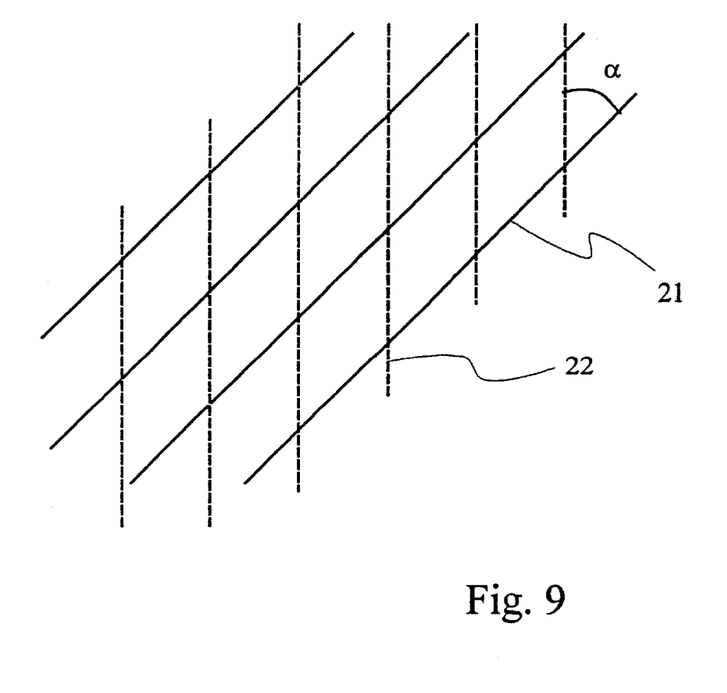
FIG. 9 shows the mutual arrangement of the filament arrays of a side-cut shield of the invention.

FIG. 9 shows the mutual disposition of the filament arrays of the side-cut shield of the invention. In the figure, the first filament array 21 is shown with continuous lines and the second filament array 22 with broken lines. In addition, the figure illustrates the angle α between the filament arrays 21 and 22.

What is claimed:

1. A radial tire having an outer surface including a tread, two opposing shoulder areas, two opposing sidewalls and two opposing bead areas, and having inner portions including one or more plies, and one or more belt layers positioned between the tread and the plies, the radial tire comprising:
   two side-cut shields are disposed one in each sidewall of the radial tire, each of the side-cut shields comprising at least two plies with a first filament array, which includes mutually substantially parallel filaments, and a second filament array, which includes mutually substantially parallel filaments, the filaments in the first filament array being at an angle α to the filaments of the second filament array, the angle α being 20°–90°, and the side-cut shields being disposed to extend from the shoulder areas of the radial tire in a direction of the sidewalls to at least the heels of the bead areas such that radially outer edges of the side-cut shields facing the shoulder areas are disposed between the belt layers and the plies and radially inner edges of the side-cut shields are disposed between an inner liner and a main tire carcass portion.

2. The radial tire of claim 1, wherein the angle α is 30°–70°.

3. The radial tire of claim 1, wherein the angle α is 40°–60°.

4. The radial tire of claim 1, where a number of plies in the side-cut shield is 2–10.

5. The radial tire of claim 1, where a number of plies in the side-cut shield is 2–4.

6. The radial tire of claim 1, wherein said plies are disposed overlapping in the side-cut shield.

7. The radial tire of claim 1, wherein the filament in said filament arrays are made of an organic or an inorganic material.

8. The radial tire of claim 1, wherein the filaments are steel, polyamide, aromatic polyamide or rayon filaments.

9. The radial tire of claim 1, wherein the sidewalls comprise, viewed from the outer surface towards the inner parts of the radial tire, ply turn-ups, plies and an inner liner.

10. The radial tire of claim 1 wherein the bead areas comprise:
   viewed from the outer surface towards the inner parts of the radial tire, a clinch, turn-ups of the plies, an apex and a bead wire, plies and an inner liner, and ankles, heels, bead bases and toes.

11. The radial tire of claim 10, wherein the side-cut shields are disposed on the sidewalls between the sidewall or the clinch and any turn-up of the plies or the plies.

12. The radial tire of claim 1, wherein in that the side-cut shields extend to the shoulder areas, starting from their edge facing wing areas to a distance that accounts for 5%–100% of the width of the shoulder area.

13. The radial tire of claim 10, wherein the edges of the side-cut shields facing the bead areas are disposed in the heels of the radial tire.

14. The radial tire of claim 10, wherein the edges of the side-cut shields facing the bead areas are disposed in the bed bases of the radial tire.

15. The radial tire of claim 10, wherein the edges of the side-cut shields facing the bead areas are disposed in the toes of the radial tire.

16. The radial tire of claim 10, wherein the side-cut shields are disposed to extend from the shoulder areas of the radial tire, through the bead base, and toward the inner surface of the radial tire.

17. The radial tire of claim 16, wherein the side-cut shields are disposed to extend from the inner surface of the radial tire, from a height that accounts for 3%–80% of the height of the side of the radial tire, starting from the toe, through the bead base to the shoulder areas of the radial tire.

18. A radial tire having an outer surface including a tread, two opposing shoulder areas, two opposing sidewalls, and two opposing bead area with opposing heals, and having inner portions including one or more plies, and one or more belt layers positioned between the tread and the plies, the radial tire comprising:
   two side-cut shields disposed one in each side wall of the radial tire, each of the side-cut shields comprising at least two plies with a first filament array, which includes mutually substantially parallel filaments, and a second filament array, which includes mutually substantially parallel filaments, the filaments in the first filament array being at an angle $\alpha$ to the filaments of the second filament array, the angle $\alpha$ being 20°–90° and the side-cut shields being disposed to extend in a direction of the sidewalls from the shoulder areas to at least the heels of the bead areas, the bead areas comprising, viewed from the outer surface toward the inner parts of the radial tire, a clinch, turn-ups of the plies, an apex and a bead wire, plies and an inner liner, and ankles, heels, bead bases and toes, wherein edges of the side-cut shields facing the shoulder areas are disposed between the belt layers and the plies;

wherein the side-cut shields are disposed between the clinch and any turn-up of the plies or the bead wire in the heel, the bead base and the toe, and between the inner liner and the plies in the areas of an inner surface of the radial tire.

19. The radial tire of claim 1, wherein the side-cut shields are disposed symmetrically on both sides of a peripheral central line of the tread of the radial tire.

20. A method for manufacturing radial tire of a vehicle, comprising:

manufacturing a blank on a manufacturing drum by disposing on the manufacturing drum in the following order: plies extending from a first bead area to a second bead area of the radial tire to be manufactured, two sidewalls on both sides of a central plane of the radial tire to be manufactured and two shoulder areas on both sides of said central plane, the shoulder areas being disposed in the radial tire between a surface to be in road contact and said sidewall during free rotation of the tire, disposing on the blank, a belt package comprising belt layers and an undertread and having a width substantially equalling a tread of the radial tire, disposing the tread on the belt package, resulting in a tire blank, vulcanising the tire blank, and disposing on both the sidewalls of the radial tire two side-cut shields, which include at least two plies, the plies comprising a first filament array having mutually substantially parallel filaments, and a second filament array having mutually substantially parallel filaments, the filaments in the first filament array being at an angle $\alpha$ relative to the filaments of the second filament array, the angle $\alpha$ being 20°–90°, and side-cut shields being disposed to extend from the shoulder areas of the radial tire in a direction of the sidewalls to at least the heels of the bead areas such that radially outer edges of the side-cut shields facing the shoulder areas are disposed between the belt layers and the plies and radially inner edges of the side-cut shields are disposed between an inner liner and a main tire carcass portion.

21. The method of claim 20, wherein disposing the two side-cut shields occurs between disposing the plies and the sidewalls.

* * * * *